United States Patent [19]

Spiridonov

[11] 4,166,710
[45] Sep. 4, 1979

[54] DEVICE FOR SECURING A PIPELINE IN PLACE

[76] Inventor: Viktor V. Spiridonov, 7-ya Parkovaya ulitsa, 23a, kv. 64, Moscow, U.S.S.R.

[21] Appl. No.: 919,280

[22] Filed: Jun. 26, 1978

[51] Int. Cl.² .......................... F16L 1/00; F16L 55/00
[52] U.S. Cl. ..................................... 405/172; 138/105
[58] Field of Search ................... 61/113, 105, 150, 43; 138/103, 105, 106, 178; 114/206, 208 R, 208 A; 405/172

[56] References Cited

U.S. PATENT DOCUMENTS

| | | | |
|---|---|---|---|
| 2,518,981 | 8/1950 | Edwards | 61/113 X |
| 3,793,845 | 2/1974 | Keith | 61/117 X |
| 3,797,260 | 3/1974 | Webb | 61/113 |

*Primary Examiner*—Jacob Shapiro
*Attorney, Agent, or Firm*—Lackenbach, Lilling & Siegel

[57] ABSTRACT

The invention relates to contact shoes secured to ballast weight surfaces adjoining a pipeline, with at least two of said shoes being mounted below the pipeline longitudinal axis. The ballast weights are interconnected above the pipeline by means of an articulated joint and securing means, the latter being mounted above the articulated joint and comprising a resilient distance piece.

7 Claims, 2 Drawing Figures

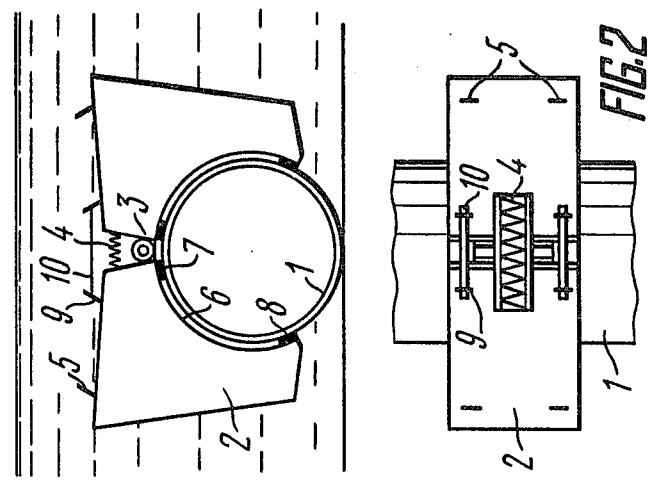
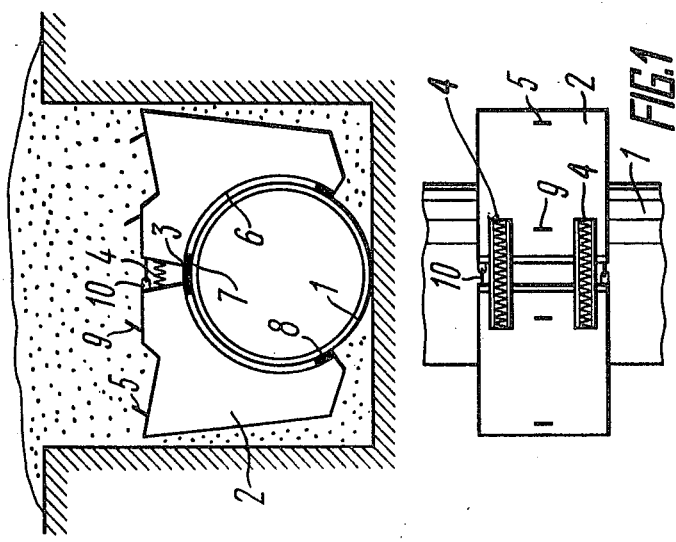

DEVICE FOR SECURING A PIPELINE IN PLACE

BACKGROUND OF THE INVENTION

The present invention relates to means of construction in heaving, water-saturated or non-cohesive grounds, including permafrost areas. More particularly, it relates to devices for securing in place underwater or underground structures and for improving the reliability of such structures, for example, pipelines in water-saturated or flooded areas, as well as pipeline sections subjected to variations in temperature and pressure, or those pipelines and/or sections movable under the effect of said factors, and it relates to their course of assembly.

Devices for securing pipelines in place, according to the present invention, can be used in industrial and civil construction and for building various pipelines, primarily, in the petroleum-and-gas industry for building high-pressure large-diameter gas- and oil pipelines, including those for the conveyance of cooled gas. The devices of the invention can be used most advantageously for securing in the design position gas- and oil pipelines of very large diameter (over 500 mm) laid out underground in unstable water-saturated grounds, for example, in peat bogs, in river plains, in areas of permafrost, the latter of which loses its supporting power upon defrosting and to areas subject to frost heaving, as well as in heaving grounds. It appears expedient to use the herein-disclosed devices for securing a pipeline in irrigated ground to increase the forces of cohesion of the pipeline with the ground, as well as in pipeline sections subjected to high temperature (for example, after a compressor station) and in non-cohesive grounds for ensuring the pipeline stability. The devices of the invention can be used to advantage in pipeline sections subject to shifting in the course of operation, as well as those shifted together with ballast means during assembly, for example, when assembling pipeline lengths by a floating technique, or by the gradual building up and ballasting with subsequent pulling through swamped areas. It is likewise expedient to use the disclosed devices for reducing the required amount of ballast in pipelines due to an increased cohesion of the pipeline with surrounding ground attained through the use of the devices of the invention.

Such devices can further be used for improving the reliability and stability of pipelines to avalanche destruction, especially those designed for conveying cooled gas.

With an increase of the pipeline diameter, as well as of the temperature of the product being conveyed and of the pressure inside the pipeline, the longitudinal forces along the pipeline tend to grow sharply while the specific forces of the pipeline cohesion with the surrounding ground decrease. In addition, the shifting of the bulk volume of present day pipeline construction to northern regions abounding in non-cohesive, finely dispersed, unstable and water-saturated grounds is further conducive to a sharp reduction in the holding power of the ground, particularly in those permafrost areas which thaw out in the warmer months of the year.

Under such conditions, trenches in which pipelines are laid frequently lack stable walls. The combination of all these factors has resulted in that large-diameter pipelines tend to shift in the ground during operation, both laterally and longitudinally. Prior art devices for securing pipelines, made as saddle-shaped ferroconcrete weights loosely hung on the pipelines, are unsuited for such operating conditions and tend to slide off the pipelines readily and damage the insulating coating, as well as fail to ensure the pipeline stability in the ground.

There are known in the art articulated weights comprising two ballast elements interconnected by means of a hinge. However, such weights tend to slide off the pipeline even more readily than the saddle-shaped ones since, upon lateral shifting of the pipeline, one half of the weight rests against the ground, transmitting part of the weight load thereto, while the other half generally tends to open up rotating around the hinge. In addition, the use of such weights requires wider trenches having a uniform plane bottom surface over a cosiderable width, which is practically impossible under conditions of swamped ground, and the use of rotary bucket excavators when digging trenches is prohibited.

Further studies resulted in the development of articulated weights, each comprising two identical elements encompassing the pipeline over more than a half of its circumferential perimeter and made fast on the pipeline by means of securing means including a wedge breechblock tightened by a screw joint. However, said weight failed to find application in construction due to the following disadvantages: the wedge block precludes the possibility of tightening the weight elements on the pipeline with a desired force; upon pressure variation in the pipeline, the tightening force tends to vary as well and to disappear gradually; the screw joint of the wedge breechblock often must be screwed underwater, which is rather inconvenient; it is practically impossible to check the tightening force; the removal of such weight during repairs is next to impossible for the screw joint is likely to corrode in the course of time and becomes very hard to unscrew; and the weight thereof also damages the insulation.

A weight has been developed recently, comprising two metal collars on which ferroconcrete elements are hung on both sides of the pipeline. However, these weight also suffers from a number of disadvantages, namely, inadequate ballasting power; the weight may tip over when resting against the ground and on shifting the pipeline to the side; considerably wider trenches are required, and it is impossible to use rotary bucket excavators for digging trenches; high steel consumption by the collars and the need to assemble the weight in situ; the need for two rigging men instead of one for assembly purposes; and the need for mechanical protection of the anticorrosion coating of the pipeline, as well as the possibility of damage to insulation due to the random manner in which the weight elements rest against the pipeline. While so doing, all of the afore-listed prior art devices for securing pipelines in place practically fail to attain any marked increase of the force of holding the pipeline in the ground or to ensure reliable operation of the pipelines.

In order to improve the stability of the attached weights, since the center of gravity of their mass tends to lower, as a result of which almost the entire mass of the weight gets sunk in water-saturated ground, this leading to the loss of up to 40% of the ballasting power of the weight, the use of a considerably greater number of weights is required. The stability of pipeline position in the ground in the absence of compensator means (most frequent scheme of operation) can be ensured with the aid of two factors, namely, ballasting the pipeline and increasing the force with which it is entrapped in the surrounding ground. However, none of the prior art weight structures provide a possibility of making use of the latter factor, that of increasing the pipeline entrapment force, which results in a sharp increase of the required ballast volume (by about 30%).

There is also known a method of coating pipes with concrete, however, this is a very costly method of securing pipelines, characterized by limited ballasting power due to a limited thickness of the concrete coating. This method further calls for changes in the construction process which is often impossible. At the same time, the weight of the pipes and the rigidity of the pipeline increase sharply, while the cohesion of pipeline with the surrounding ground increases but slightly. Therefore, the coating of pipes with concrete in swamped and flooded areas, especially in the North, is done as an exception to the general rule. This method is mainly used when laying a pipeline from a barge or when pulling a pipeline through a flooded trench from a stationary platform.

Prior art structures of ballasting devices fail to grip the pipeline tightly enough and, despite heavy material consumption, cannot be used with adequate efficiency as a means for precluding the avalanche destruction of pipelines.

Therefore, prior art devices for securing pipelines fail to provide reliable and efficient securing of pipelines laid out in swamps and flooded areas characterized by non-cohesive finely dispersed grounds.

SUMMARY OF THE INVENTION

It is the principal object of the present invention to provide a device for securing a pipeline in place, said device ensuring pipeline reliability and stability when laid out in non-cohesive, unstable and heaving grounds, as well as in water-saturated or flooded areas.

It is another object of the present invention to provide a device for securing a pipeline in place, said device being capable of self-locking on the pipeline and gripping the latter with a force exceeding considerably the weight of said device, thereby increasing the pipeline cohesion with non-cohesive grounds.

It is still another object of the present invention to provide a device for securing a pipeline in place, said device ensuring a reliable attachment thereof to the pipeline upon variations of the internal pressure and temperature of the latter, as well as upon shifting of the pipeline in the longitudinal and lateral directions in the course of operation and assembly.

It is yet another object of the present invention to provide a device for securing a pipeline in place, said device acting upon the pipeline surface and serving to improve the pipeline resistance to avalanche destruction, as well as to reduce the affected area upon the pipeline rupture.

It is one more object of the present invention to provide a device for securing a pipeline in place, said device ensuring a reliable attachment thereof to the pipeline with the center of gravity of the device positioned at a high level, this permitting of the maximum utilization of the ballasting power of the device.

It is a further object of the present invention to provide a device for securing a pipeline in place, said device ensuring the safety of the pipeline insulating coating without the need for special protection of said coating against mechanical effect, for example, with the aid of a lining.

It is still a further object of the present invention to provide a device for securing a pipeline in place, said device serving to facilitate the assembly and disassembly in the course of repairs and of pipeline construction.

It is yet a further object of the present invention to provide a device for securing a pipeline in place, said device ensuring a possibility of laying the pipeline in trenches of minimum width dug by means of a rotary bucket excavator.

It is still a further object of the present invention to provide a device for securing a pipeline in place, which device can be mounted on the pipeline before the latter has been laid down on the trench bottom, with a subsequent laying out of a pipeline length on the bottom.

It is another object of the present invention to provide for a uniform transfer of load from the pipeline to the device for securing same in place, as well as for the reduction of stresses in the pipeline over the areas secured by said devices.

It is one more object of the present invention to expand the sphere and geographical area of application of general-purpose devices for securing pipelines in place.

It is also an object of the present invention to reduce the labor and material consumption and costs of securing pipelines under conditions of swamped, permafrost, heaving and non-cohesion water-saturated grounds while improving the reliability of the pipelines.

The invention accomplishes these and other objects by using a device for securing a pipeline in place, made as a pair of symmetrically arranged ballast weights adjoining the pipeline and encompassing over a half of its circumferential perimeter. The weights are interconnected above the pipeline by means of an articulated joint and securing means, arranged one above the other, and carry on their surfaces mounting slings arranged symmetrically with respect to the vertical plane of symmetry. In accordance with the present invention, contact shoes are attached to the ballast weight surfaces adjoining the pipeline, and at least two of said shoes being are arranged below the pipeline longitudinal axis above which and over the articulated joint there is mounted the securing means including a resilient distance piece.

It is expedient that the contact shoes of each one of the ballast weight surfaces adjoining the pipeline should be attached to top and bottom ends thereof.

The device of the invention may have, according to one of its embodiments, the articulated joint of the ballast weights in the form of a resilient plate extending horizontally between adjoining weight surfaces.

The herein disclosed invention resides in contact shoes attached to the surfaces of two ballast weights articulated with each other, with said surfaces adjoining the pipeline, and at least two of said shoes arranged below the pipeline longitudinal axis above which and over the articulated joint there is mounted securing means including a resilient distance piece.

With such arrangement, the weight is in fact self-gripping, which helps to ensure its stability on the pipeline even if the center of the weight masses is at a high level with respect to the pipeline axis which, in turn, provides a possibility of efficient utilization of the weight due to the fact that the bulk of the weight is located most of the time during operation above the water level and, therefore, does not lose weight due to displaced water. In addition, such a structure of the weight helps to maintain the existing dimensions of trenches without increasing the volume of the earthwork while laying out the pipeline. A tight fit of the weights on the pipeline, ensured by the provision of the contact shoes and the resilient distance piece, independent of temperature and internal pressure variations in the pipeline, helps both to improve the reliability of ballasting the pipeline and to increasng the degree of the pipeline cohesion with the ground, as well as increase the pipeline resistance to avalanche destruction and reduce the area affected by pipeline destruction. If resilient pads made of rubber, brisol or like materials are attached to the contact shoes, there is no further need to protect the insulation from being mechanically damaged by the weight, as is the case with the prior art weights.

Tests have shown the herein disclosed devices to be capable of developing pipeline compressing forces exceeding by several times the weight of the device, which helps to maintain their stability on the pipeline practically at any possible angle of inclination of the weight and pipeline. This feature also enables the devices to be mounted with the aid of standard sling ropes by way of simply hanging the devices on the pipeline by means of a lifting mechanism, with the forces required for compressing the resilient securing means and for opening the weights being developed due to the appropriate combination and arrangement of the centers of mass of the ballast weights and to angles of inclination of mounting ropes made fast in the slings.

In the case of pipeline repairs, the devices of the invention can be readily removed from the pipeline with the aid of the mounting slings.

Therefore, the devices for securing pipelines in place, according to the present invention, offer a complex solution to the problems of improving the reliability of pipeline ballasting, increasing the force of holding the pipeline in the ground, improving the pipeline reliability, protecting the insulating coating, facilitating the assembly and repairs of the pipelines and in improving the economic efficiency of securing pipelines in place.

In addition, the devices of the invention help expand the sphere of their application and may be used in pipeline structures and in construction processes in which they have not been used heretofore. For example, self-gripping ballast weights can be used in pipeline systems in which provision is made of compensation for longitudinal deformations, the pipelines being capable of shifting in the ground or peat longitudinally or laterally with respect to their axis. They can also be used when crossing rivers in place of the currently used cast iron weights, especially, in river plain areas. They can be further used when assembling pipelines by floating via canals in swamps, formed by explosion, etc.

It is expedient that the contact shoes of each one of the ballast weight surfaces adjoining the pipeline should be attached to top and bottom ends thereof, this resulting in the most favorable distribution of leads from the contact shoes to the pipeline.

One of the embodiments of the structure according to the invention may have an articulated joint of the ballast weights in the form of a resilient plate extending horizontally between adjoining weight surfaces. There can be two or more such plates, while their thickness depends on the strength properties of the resilient material such as steel. Such an arrangement of the articulated joint is the simplest one and adequately reliable.

The rigidity of resilient distance pieces which can be made in the form of, for example, coiled steel springs, depends on the characteristics of the pipeline and the surrounding grounds, as well as on the pipeline operation scheme. If the pipeline is to be fully entrapped, the resilient distance piece is selected such that the force of securing the weight on the pipeline should be greater than the force with which the pipeline with weights is entrapped in the surrounding ground.

The device for securing pipelines in place, according to the present invention, possesses considerable advantages over similar devices of other types, is universal from the viewpoint of its utilization and yields a considerable economic effect.

BRIEF DESCRIPTION OF THE DRAWINGS

These and other objects and advantages of the present invention will become apparent upon considering the following detailed description of the herein disclosed device for securing a pipeline in place, reference being had to the accompanying drawings in which:

FIG. 1 illustrates the device of the invention for securing a pipeline in place, having two resilient distance pieces and an articulated joint in the form of a flat steel spring; and FIG. 2 illustrates the device of the invention for securing a pipeline in place, having one resilient distance piece and an articulated joint in the form of two cylindrical slings interconnected by means of a pin.

DESCRIPTION OF THE PREFERRED EMBODIMENTS

Referring now to FIG. 1 of the drawings, the herein disclosed device for securing a pipeline 1 in place is fashioned as a pair of symmetrically arranged ballast weights 2 adjoining the pipeline and encompassing over a half of its circumferential perimeter. The weights are interconnected above the pipeline 1 by means of an articulated joint 3 and securing means 4, arranged one above the other, and carry on their surfaces mounting slings 5 arranged symmetrically with respect to the vertical plane of symmetry. Contact shoes 7 and 8 are attached to arcuate surfaces 6 of the ballast weight 2 adjoining the pipeline 1, and at least two of said shoes being arranged below the longitudinal axis of the pipeline 1. The securing means 4 can be made as one (FIG. 2) or more (FIG. 1) resilient distance pieces located between the ballast weights 2 and made, for example, in the form of coiled compression springs.

It is possible to attach lifting slings 9 and limiting rods 10 to the surfaces of the ballast weights 2 between the mounting slings 5, and said slings 9 and limiting rods 10 enabling one to lift and displace the device without the aid of the securing means 4 and without opening the ballast weights 2. The articulated joint 3 provided in the device for securing a pipeline in place can be made either in the form of cylindrical slings interconnected by means of a pin (FIG. 2) and attached to the adjoining surfaces of the ballast weights 2, or in the form of a resilient plate (FIG. 1) extending horizontally between the adjoining surfaces of the weights 2.

The device for securing a pipeline in place operates in the following manner.

While in storage or during transportation, the device of the invention rests on a foundation with its bottom edges, the invariability of the geometric dimensions being ensured by the joint effect of the resilient distance piece and limiting rod 10. When loaded onto a vehicle, the device for securing the pipeline 1 is seized by the lifting slings 9, thereby obviating the need for opening the ballast weights 2. During its assembly on the pipeline 1, the device is seized by means of a sling rope by the mounting slings 5, thereby ensuring the compression of the resilient distance piece or coiled spring and opening of the ballast weight. Following the mounting on the pipeline 1 and release of the mounting slings 5, the ballast weights 2 are joined under the effect of the resilient distance piece and made fast on the pipeline, due to the concentration of their load and reactive force of the resilient distance piece or coiled spring upon the contact shoes 7 and 8. In order to increase the force with which the pipeline 1 is entrapped by the ground, it is practical to coat the contact shoes with a material having a high coefficient of friction and, if necessary, provide for the pipeline slippage relative to the device for securing the pipeline during operation. It is further practical to provide the contact shoes with an antifriction material, and the pipeline surface in places of contact therewith with an appropriate counterbody. The antifriction and counterbody materials are selected depending on the operating conditions of the given pipeline section.

As seen from the specification, the device for securing a pipeline in place is in fact a self-gripping one, which provides for its stability on the pipeline when the center of the weight masses is at a high level with respect to the pipeline axis, as well as for an efficient utilization of the weight mass. Such a structure helps to maintain the existing dimensions of trenches without increasing the volume of earthwork while laying out the pipeline. A tight compression of the pieplire, independent of temperature and internal pressure variations in the pipeline, helps both to improve the reliability of ballasting the pipeline and to increasing the degree of the pipeline cohesion with the ground, as well as increase the pipeline resistance to avalanche destruction and reduce the area affected by pipeline destruction. The device and its structure ensures the safety of the pipeline insulating coating without the need for any special protection against mechanical damage. The device of the invention can be almost universally used in the various spheres of application in the field of pipeline construction.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. A device for securing a pipeline in place, comprising: a pair of symmetrically arranged ballast weights adjoining the pipeline and encompassing more than a half of its circumferential perimeter; contact shoes attached to the surfaces of said ballast weights, adjoining the pipeline, at least two of said contact shoes being arranged below the longitudinal axis of said pipeline; an articulared joint and securing means, with the aid of which said ballast weights are interconnected above said pipeline; said securing means, and said articulated joint arranged one above the other and, having a resilient distance piece; and said ballast weights carrying on their surfaces mounting slings arranged symmetrically with respect to the vertical plane of symmetry.

2. A device as claimed in claim 1, wherein the contact shoes of the surfaces of each ballast weight, adjoining the pipeline, are attached to top and bottom ends thereof.

3. A device as claimed in claim 1, wherein the articulated joint includes a resilient plate extending horizontally between adjoining ballast weight surfaces.

4. A device as claimed in claim 3, wherein a plurality of resilient plates are employed.

5. A device as claimed in claim 3, wherein said resilient plate is in the form of a flat steel spring.

6. A device as claimed in claim 1, wherein the articulated joint is in the form of cylindrical slings interconnected by means of a pin and attached to the adjoining surfaces of said ballast weights.

7. A device as claimed in claim 1, wherein said resilient distant piece is a coiled spring.

* * * * *